US 6,567,044 B2

(12) United States Patent
Carroll

(10) Patent No.: US 6,567,044 B2
(45) Date of Patent: May 20, 2003

(54) MINIATURE, UNMANNED REMOTELY GUIDED VEHICLES FOR LOCATING AN OBJECT WITH A BEACON

(76) Inventor: Ernest A. Carroll, 12913 Alton Sq. No. 114, Herndon, VA (US) 20170

( * ) Notice: Subject to any disclaimer, the term of this patent is extended or adjusted under 35 U.S.C. 154(b) by 0 days.

(21) Appl. No.: 09/956,148

(22) Filed: Sep. 20, 2001

(65) Prior Publication Data

US 2003/0052823 A1 Mar. 20, 2003

(51) Int. Cl.[7] ............................................... G01S 3/02
(52) U.S. Cl. ........................................................ 342/465
(58) Field of Search .......................... 342/465, 357.06, 342/357.07, 357.17, 430, 387

(56) References Cited

U.S. PATENT DOCUMENTS

| | | | |
|---|---|---|---|
| 4,819,053 A | | 4/1989 | Halavais |
| 4,975,707 A | * | 12/1990 | Smith .................... 342/357.17 |
| 5,751,246 A | | 5/1998 | Hertel |
| 5,935,196 A | * | 8/1999 | Brodie et al. ............... 701/213 |
| 6,067,018 A | | 5/2000 | Skelton et al. |
| 6,091,957 A | | 7/2000 | Larkins et al. |
| 6,298,306 B1 | * | 10/2001 | Suarez et al. .......... 342/357.07 |
| 6,422,508 B1 | * | 7/2002 | Barnes ....................... 342/192 |

OTHER PUBLICATIONS

Applications for mini VTOL UAV for law enforcement, Murphy et al., Proc. SPIE vol. 3577, p. 35–43, Sensors, C3I, Information, and Training Technologies for Law Enforcement, Jan. 1999.*

Fly spy: lightweight localization and target tracking for cooperating ground and air robots, R.T. Vaughan et al., Proc. Int. Symp. Distributed Autonomous Robot Systems, 2000.*

* cited by examiner

Primary Examiner—Thomas H. Tarcza
Assistant Examiner—Fred H Mull
(74) Attorney, Agent, or Firm—David L. Banner

(57) ABSTRACT

Apparatus for and method of locating a subject being monitored as to whereabouts. A beacon having a radio frequency transmitter and receiver is attached to the subject. At least three scanning platforms each having a radio receiver and transmitter and, optionally, an onboard microprocessor and an atomic clock, issue signals which will evoke response signals from the beacon. A central station having a microprocessor, radio receiver and transmitter, and preferably, a display or other output for annunciating location of the sought subject, manages the search. At least one scanning platform is a miniature, unmanned, remotely a piloted vehicle, preferably an aircraft, which passes over a predetermined search area. Response signals from the beacon, when received at a scanning platform, are processed to enable determination of location of the beacon and hence the sought subject by triangulation. Time and location data are acquired by interaction with the global positioning system by the scanning platforms. Alternatively, a single mobile scanning platform can locate the beacon by localization, wherein characteristics of response signals are analyzed and processed.

11 Claims, 4 Drawing Sheets

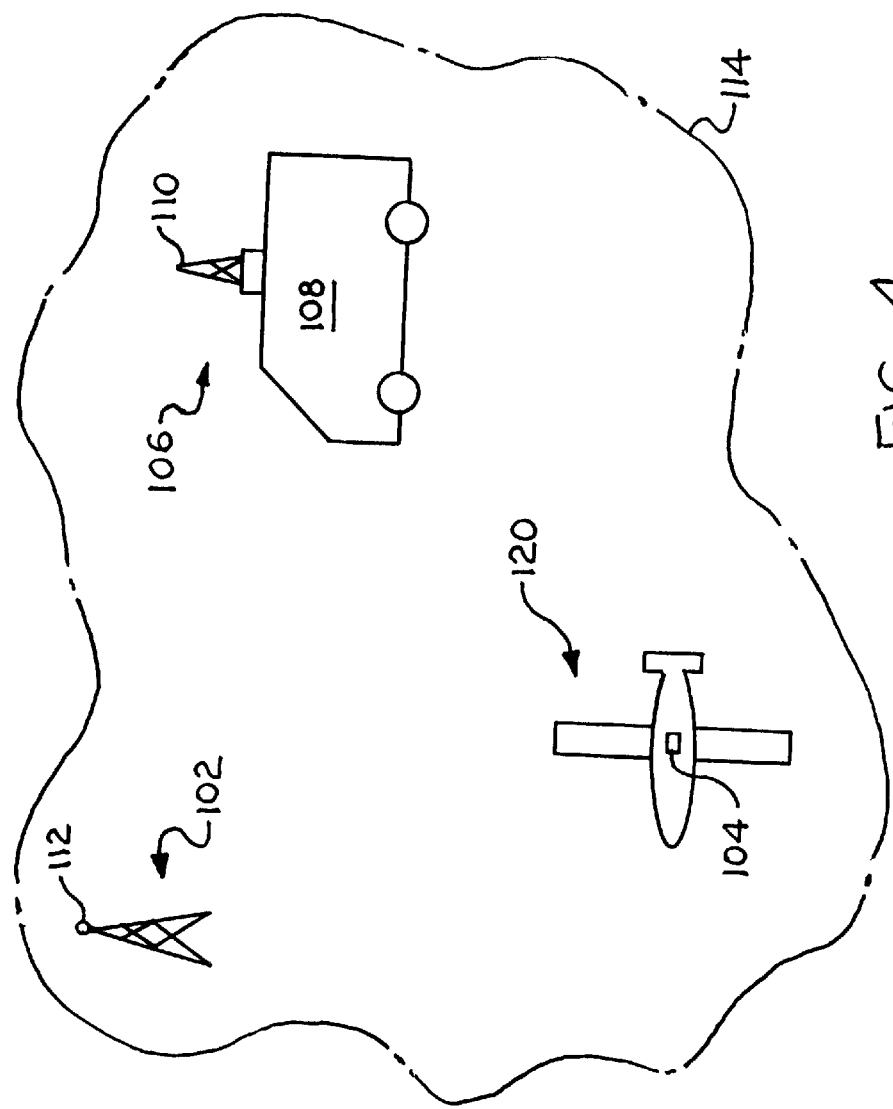

MINIATURE, UNMANNED REMOTELY GUIDED VEHICLES FOR LOCATING AN OBJECT WITH A BEACON

BACKGROUND OF THE INVENTION

1. Field of the Invention

The present invention relates to locating systems of the type employing radiant energy signals and triangulation methods, and more particularly, to systems employing at least one mobile scanning platform such as, for example, a miniature aircraft, for issuing signals which evoke a response from a beacon attached to the subject of the search.

2. Description of the Prior Art

From time to time, it may be necessary or desirable to locate a person or an object which has disappeared or is out of sight or ready control of a person charged with monitoring the person or object. This is particularly true for people who have limited capacity to understand constraints on their freedom of movement and monitoring equipment employed to track them. For example, patients in health care facilities and children may possibly wander off and become lost to their care providers or other responsible parties. In other examples, whereabouts of those subject to house arrest programs must be monitored by civil authorities. Inanimate objects such as objects of great value or vehicles must be tracked to assure that no theft has occurred, or that the object or vehicle is where it should be.

It has become possible to implement remote locating systems with the advent of radio frequency communications and systems such as the Global Positioning System (hereinafter referred to as GPS) or an equivalent. Such systems are intended to be able to locate a missing person or object which carries a radio frequency transceiver. A person charged with authority or responsibility to monitor or periodically ascertain location of a person or object can employ a remote locating system to determine the location of the sought person or object despite vast distances which may exist between the sought person or object and the person monitoring the same. Additionally, great distances among components of apparatus of a locating system, the sought person or object, and the person monitoring the sought person or object may be easily overcome by a suitable locating system.

It would be possible to use a triangulation based system reliant upon the GPS. However, this may require objectionably large, sophisticated, or expensive components carried aboard the object or person being monitored. It is therefore desirable to provide a locating system which minimizes complication, cost, and bulk of components carried by or attached to the person or object being monitored as to location.

It further is desirable to be able to cover a wide geographic area. This is not feasible with scanners or other radio frequency devices mounted on buildings, towers, or the like. Rather, it is preferable to provide a scanner on aircraft. One advantage of aircraft based scanners is that such a location is best able to overcome attenuation of a radio frequency signal, as is frequently caused by physical objects which interfere with horizontal or nearly horizontal propagation of signals. An aircraft flying over a beacon benefits from relatively unimpeded "downward looking" receivers, and thus can detect signals which might otherwise go undetected.

The prior art has suggested locating systems which in part rely upon the GPS. Illustratively, U.S. Pat. No. 4,819,053, issued to Richard A. Halavais on Apr. 4, 1989, describes a single point locating system wherein a scanner is located on an aircraft. Similarly, U.S. Pat. No. 4,975,707, issued to Jordan R. Smith on Dec. 4, 1990, shows a system for locating kidnap victims wherein it is disclosed that aircraft may serve as the scanning platform.

U.S. Pat. No. 5,751,246, issued to Richard J. Hertel on May 12, 1998, features interrogation by aircraft and triangulation in a location system.

U.S. Pat. No. 6,067,018, issued to Joan M. Skelton et al. on May 23, 2000, shows a location system having body worn components, a portable component, and a base station.

U.S. Pat. No. 6,091,957, issued to John Pruett Larkins et al. on Jul. 18, 2000, illustrates child monitoring using triangulation.

The above schemes exemplify GPS based triangulation systems, but still cannot provide inexpensive, wide ranging scanning platforms which can upon demand seek out a signal beacon located at the sought person or object. Manned aircraft cannot necessarily be maintained in sufficient numbers and locations so as to be able to initiate a search on little notice. Also, use of manned aircraft, or even unmanned aircraft built on the scale of manned aircraft, entails safety considerations. For example, in severe weather conditions, aircraft are subject to disruption, such as being downed by downwardly moving air currents, being hit by lightning, and suffering other mishaps. Using such aircraft in highly populated areas entails well known hazards in the event of mishaps. There remains a need for a locating system which provides inexpensive ability to roam over a predetermined geographic area to locate a person or object.

None of the above inventions and patents, taken either singly or in combination, is seen to describe the instant invention as claimed.

SUMMARY OF THE INVENTION

The present invention provides a versatile system for implementing triangulation searches using GPS satellites. The novel system shares some concepts with known triangulation search systems, and may for example employ well known processes to perform triangulation. A significant advance in the art of triangulation searches is the use of miniature, unmanned mobile sources of signals, which sources are referred to as scanning platforms, to initiate the search. To conduct a search according to the invention, a transceiver is attached to the object or person being monitored. A plurality of scanning platforms are utilized to originate or broadcast signals which will evoke a response from the transceiver. Next, the scanning platforms, working in tandem with other apparatus, utilize the GPS to establish both precise points in time and also locations of events occurring during a search. Fourthly, a central station receives data from the scanning platforms and calculates the sought location.

It will be appreciated, then, that two triangulation operations are conducted. The first determines location of mobile scanning platforms at the time each mobile scanning platform receives a response signal. The second triangulation operation actually determines location of the sought object utilizing determined locations of the mobile scanning platforms which received response signals.

Use of unmanned, preferably miniature, remotely piloted steerable vehicles, such as aircraft, as scanning platforms greatly facilitates coverage of a target search area. As employed herein, miniature signifies that the vehicle, regardless of whether it is an aircraft, boat, or land vehicle, is too small to carry a human occupant. At least one and optionally several or all of the scanning platforms are provided by miniature, remotely piloted vehicles. The remaining scanning platforms may be stationary, portable, or mobile.

As employed herein, stationary signifies that the scanning platform is fixed to the ground both when in use and also when not being used. A scanning platform mounted on a permanently fixed tower or on a building is exemplary. Portable signifies that the scanning platform is so configured as to be readily movable such as by towing or hauling to different sites, but lacks motive power and is not moving when being used. A scanner located on an unpowered, wheeled vehicle, or placed on a platform which by virtue of uncomplicated construction and limited weight and dimensions, is readily carried on or towed by a vehicle. Mobile will be taken to signify that the scanning platform is in motion either as a draft vehicle or under its own power when being used. Aircraft, wheeled and tracked self-powered vehicles, robots, and boats, whether manned or unmanned, are all examples of mobile scanning platforms.

In the preferred embodiment, the scanning platforms are provided by miniature, remotely piloted aircraft. Aircraft can easily fly over natural and artificial obstacles which would stymie or delay ground bound vehicles. Rugged terrain, buildings, bodies of water, forests, industrial facilities, roads, and the like offer little impedance to aircraft. Another significant advantage of aircraft is that in most cases they provide downward access to the sought person or object. This is especially advantageous in that it permits the person or object carried beacon to be low powered. This minimizes bulk, complexity, and cost of the transceiver associated with the monitored person or object.

The use of mobile scanning platforms such as aircraft also enables location to be acquired both by traditional triangulation and also by localizing. This is not possible when utilizing satellites and other general purpose vehicles which are not steerable at the discretion of the searcher. The use of miniature aircraft minimizes likelihood of catastrophic consequences should the aircraft be downed. This is a consequence of limited mass, speeds, and fuel capacity of miniature aircraft. Still another advantage of miniature aircraft is that a significant number thereof can be readily transported to a distant search site in a single vehicle.

The novel system may be utilized to track people, animals, and objects. For example, it may be utilized to thwart attempted kidnappings, to locate young or incapacitated persons who have wandered off, to track wildlife, or to monitor valuable property such as borrowed, leased, or rented equipment, objects on display or stored objects, and other objects which for any reason must be monitored as to whereabouts. The novel system can be rapidly deployed, and can locate sought subjects over great expanses with minimal intrusion upon the area of search.

Accordingly, it is one object of the invention to provide a locating system utilizing at least one miniature, remotely piloted vehicle as a scanning platform.

It is another object of the invention that the miniature, remotely piloted scanning platform be able to negotiate natural and artificial obstacles, and be able to provide direct, downwardly facing signal reception.

It is a further object of the invention that at least one scanning platform be steerable at the discretion of those conducting a search.

Still another object of the invention is to minimize adverse consequences of downing of an aerial scanning platform.

An additional object of the invention is to transport many scanning platforms to remote search sites readily and conveniently.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 4 is a plan view of another embodiment of scanning apparatus.

DETAILED DESCRIPTION OF THE PREFERRED EMBODIMENTS

Figure 1:
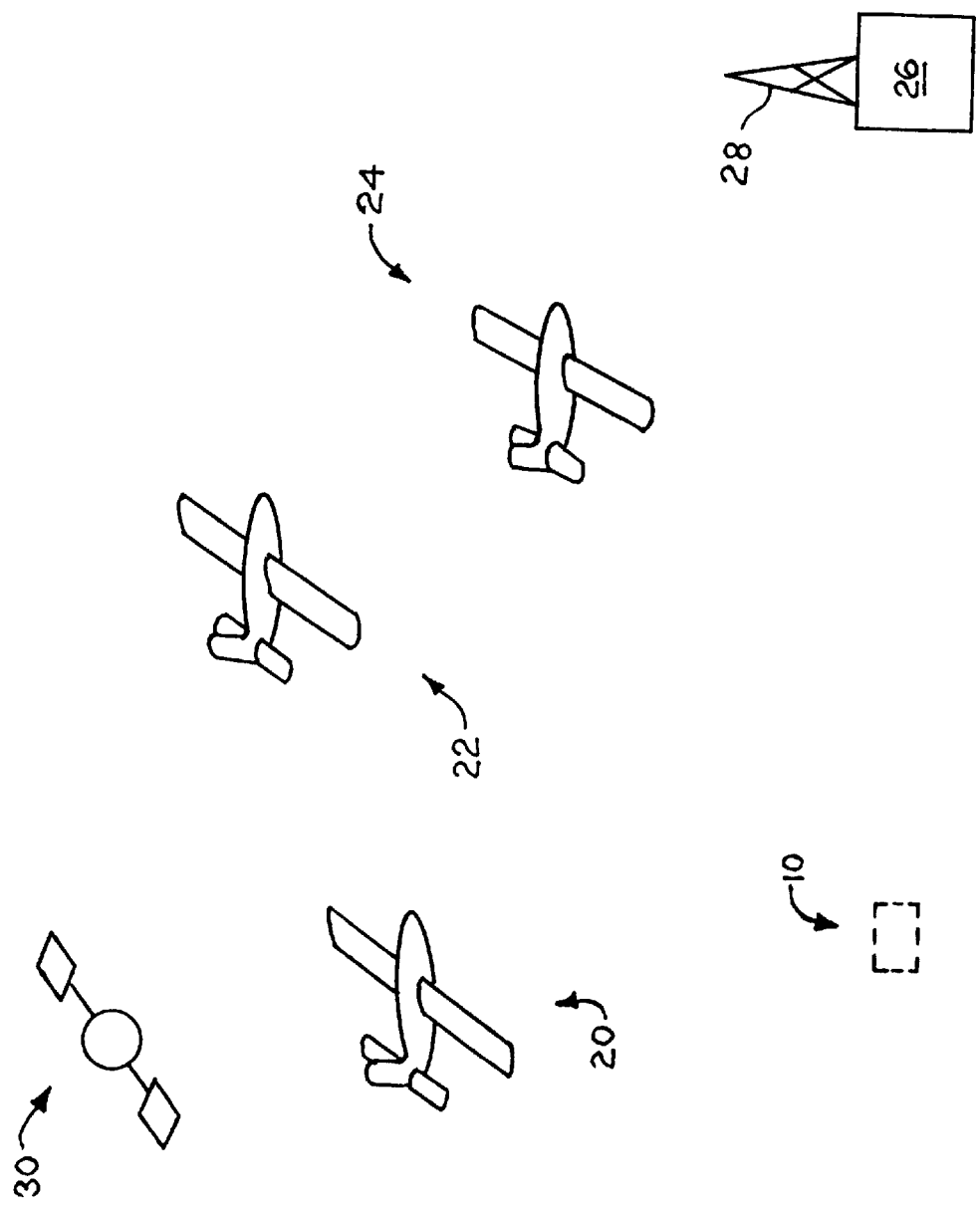
FIG. 1 is a diagrammatic view of one embodiment of apparatus for carrying out the invention.
Figure 2:
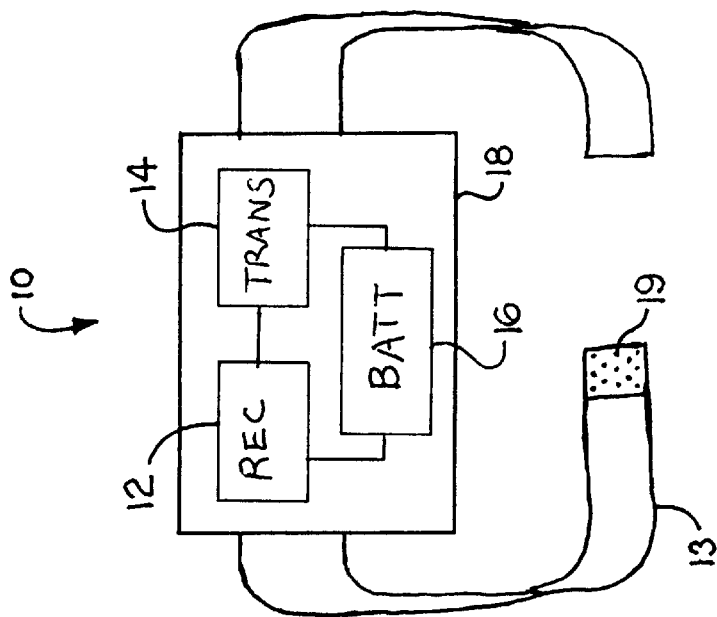
FIG. 2 is a diagrammatic detail view of a location beacon shown at the lower left of FIG. 1.

Turning now to FIG. 1 of the drawings, there is shown apparatus for locating a subject of monitoring which is out of sight of a responsible party charged with monitoring location of the subject. The subject of monitoring is a person, animal, plant, or inanimate object (none shown) to which a portable beacon 10 is attached. Beacon 10 incorporates therein a transmitter and receiver of radiant energy. As shown in FIG. 2, beacon 10 preferably comprises, as a single enclosed assembly, a receiver 12, a transmitter 14 operably linked to receiver 12, and a battery or battery cell 16 thereof connected to receiver 12 and transmitter 14. Beacon 10 may take any convenient form, such as a bracelet in the case of a body worn device carried by a person being monitored.

For monitoring people, beacon 10 may comprise a housing 18 enclosing receiver 12, transmitter 14, and cell 16 and an optional attached strap 13, patch of adhesive, or any other fastening element (none shown) for encircling or otherwise engaging a body limb or surface. In the example of FIG. 2, strap 13 is formed in two sections each bearing hook and loop fastening material 19, so that strap 13 can encircle the monitored person or object. It is further possible that housing 18 be carried in the mouth or hand or even swallowed, housing 18 being subsequently recovered after being ejected with feces. In the latter examples, it is sufficient to provide housing 18 without strap 13 or other attachment or fastening element.

Returning to FIG. 1, wherein it will be understood that the monitored subject is shown representatively only by beacon 10, search apparatus includes at least three scanning platforms in the form of miniature, remotely piloted aircraft 20, 22, 24, and a central station 26 which includes radio communications equipment represented as tower 28. Central station 26 serves to administer or manage the search, and includes necessary data processing apparatus, command input devices, displays and other output devices as may be necessary, as well as having communication facilities such as radio frequency receiver and transmitter for communicating with the scanning platforms and optionally with the GPS. Provision of power consuming components such as transmitters and receivers (either individually or in combination) will be understood to include provision of a power supply operably connected to the power consuming components, such as batteries. As further detailed hereinafter, aircraft 20, 22, 24 and optionally central station 26 can interact with the GPS, which is indicated representatively as satellite 30.

Figure 3:
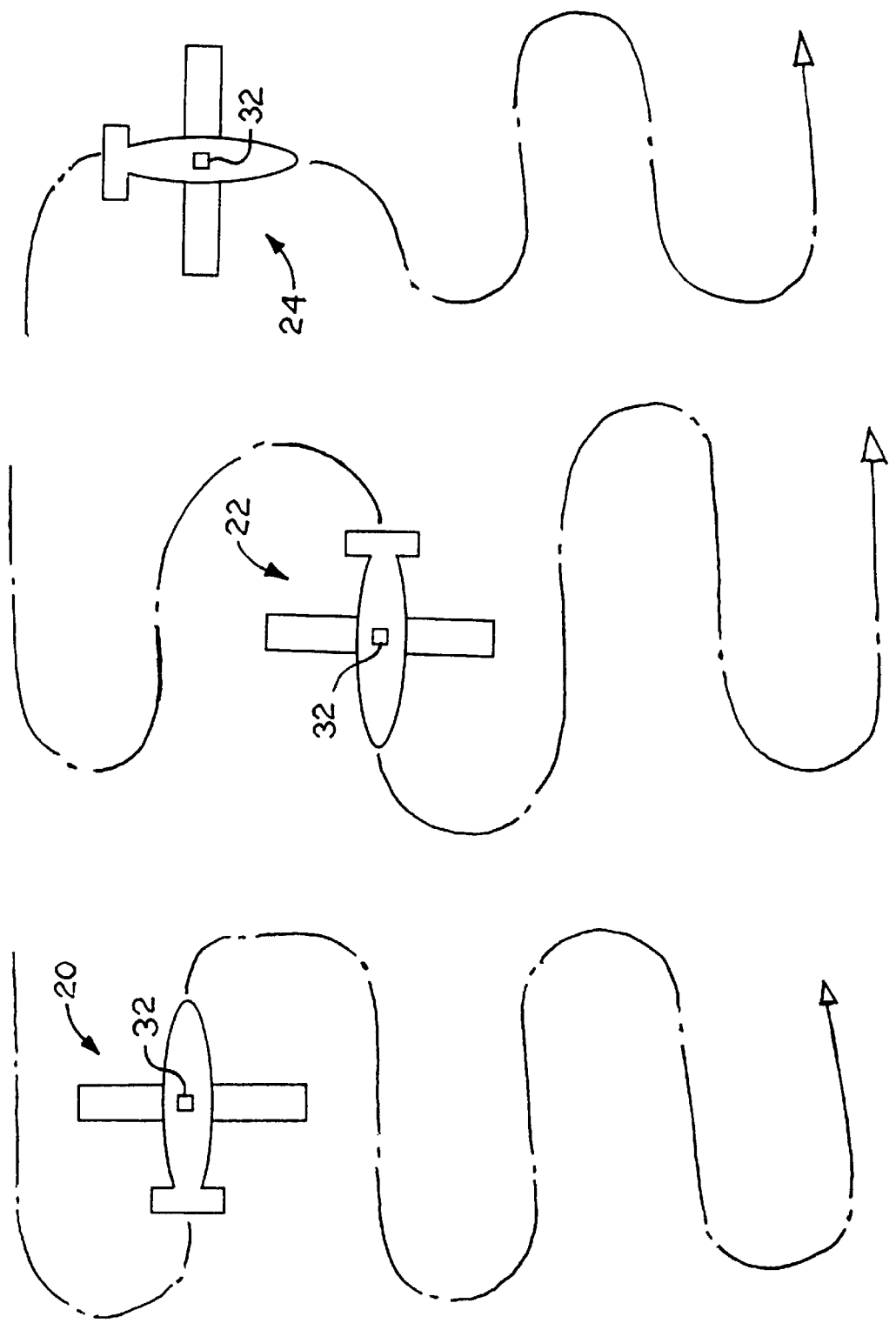
FIG. 3 is a diagrammatic plan view of one embodiment of scanning apparatus comprising three miniature, remotely piloted aircraft conducting a search while flying in a sweeping mode of operation.

The scanning platforms each include a radio frequency transmitter and receiver 32 (see FIG. 3). The transmitter is capable of transmitting activation signals which can be received by receiver 12 of beacon 10 which is attached to or otherwise operably associated with the subject being monitored. Preferably, the activation signals are encoded in a form of encryption or addressing which is readable by receiver 12 carried on the subject of monitoring. Encryption assures that only the sought subject will respond, and may further be utilized to assure added security. This is useful in situations wherein many potential subjects of monitoring are present, and it is desired that only one specific subject be enabled to issue response signals.

When a search is being conducted, the scanning platforms transmit activation signals over a predetermined search site. FIG. 3 shows a representative sweeping pattern which is undertaken when the scanning platforms are provided by aircraft 20, 22, 24. Aircraft 20, 22, 24 negotiate the search site by flying thereover in patterns so arranged as to cause each aircraft 20, 22, or 24 to overfly the subject of monitoring in communicable proximity to transmitter 14 of beacon 10. Flying patterns cause each aircraft 20, 22, or 24 to sweep over the search site in a path progressively covering the search site while not overlapping previously searched portions of the search site. This flying is performed while each aircraft 20, 22, or 24 is under remote guidance. Guidance commands can be transmitted conventionally utilizing the receiver of each aircraft 20, 22, or 24. Guidance commands preferably originate at central station 26. Optionally, guidance commands set out bounds of area being negotiated by each aircraft 20, 22, or 24. If equipped for this option, each aircraft 20, 22, or 24 has an onboard microprocessor which, together with transmitter and receiver 32, can receive and process GPS signals to control flight so as not to exceed pre-established bounds of flight and to assure coverage of a pre-established area of coverage of flight. An onboard microprocessor can also be utilized in conjunction with GPS signals to determine location of its associated scanning platform at any given moment in time. It should be noted that transmitter and receiver 32 also transmits activation signals when attempting to communicate with and locate beacon 10.

Beacon 10 is arranged to transmit a response signal responsive to receiving an activation signal from any one of the scanning platforms. Response signals issued by beacon 10 are received by any one of the scanning platforms. The scanning platform or platforms which receive response signals from beacon 10 responsively transmit location signals back to central station 26. The location signals include time and location data of each respective scanning platform when that scanning platform transmits a location signal. Time and location data are acquired by each scanning platform from interaction with the GPS by radio communication, with location calculations performed by onboard microprocessors where necessary.

Central station 26 has necessary apparatus such as a computer (not separately shown) which then performs triangulation analysis to determine location of beacon 10, and hence of the subject being monitored. Triangulation may be based, for example, on time difference of arrival of response signals detected by at least three of the scanning platforms. This is made possible by providing scanning platforms with atomic clocks. It is also possible to perform triangulation at central station 26 utilizing time and location signals from at least three scanning platforms, where scanning platforms are equipped to perform triangulation to determine their own locations.

Thus it will be seen that two levels of triangulation are utilized. The first level is performed to determine location of mobile scanning platforms at the time each receives a response signal. Location data for each mobile scanning platform can then be relayed back to central station 26. It is also possible that only one mobile scanning platform will receive a succession of response signals displaced in time from one another. Because precise location of that one mobile scanning platform can be determined at each of the several response signal receptions, location of the sought object can be approximated from a minimum of three signals from one mobile scanning platform. The second level of triangulation calculations occurs when central station 26 determines location of the sought object utilizing a minimum of three inputs from one or more scanning platforms.

FIG. 4 illustrates an alternative embodiment of the invention wherein only one scanning platform is in the form of a miniature, remotely piloted aircraft 120 having a radio transmitter and receiver 104. The other two scanning platforms include a portable scanning platform 106, which in the example of FIG. 4 is mounted on a motor vehicle 108 and includes a radio transmitter and receiver 110, and a stationary scanning platform. The stationary scanning platform is a tower 102 provided with radio transmitter and receiver 112. Radio transmitter and receiver units 104, 110, and 112 are functionally similar to those of aircraft 20, 22, and 24. GPS based location equipment may be omitted from stationary scanning platforms such as tower 102 if their locations are predetermined and known to central station 26. Requirement for GPS based location equipment remains for mobile and portable scanning platforms.

The embodiment of FIG. 4 is usable in areas which are subject to conducting periodic searches. For example, the area, which is contained within boundary 114, may be a national park or other large area wherein people are apt to become lost. When such an occurrence is a known or predictable hazard, it may not be necessary to utilize three or more remotely piloted aircraft. Rather, it is possible to utilize an existing structure such as tower 102, and to drive motor vehicle 108 to a convenient point for scanning. Most of the area within boundary 104 can be swept or scanned by aircraft 120. The method of establishing location by triangulation can be conventionally performed using the various types of scanning platforms.

In some cases, an airborne scanning platform such as aircraft 20, 22, or 24 of FIG. 1 or aircraft 120 of FIG. 4 can locate the subject of monitoring by localization, and may not require participation of other scanning platforms. When localization is utilized, one airborne scanning platform alters its previously established flight path to a new path when a response signal is received. The scanning platform which engages in localization will be the first airborne scanning platform to receive a response signal. Optionally, the localizing scanning platform sends a signal which will result in commands being generated to other airborne scanning platforms to abandon their initial sweeping patterns, and move towards the location of the localizing scanning platform.

Figure 5:
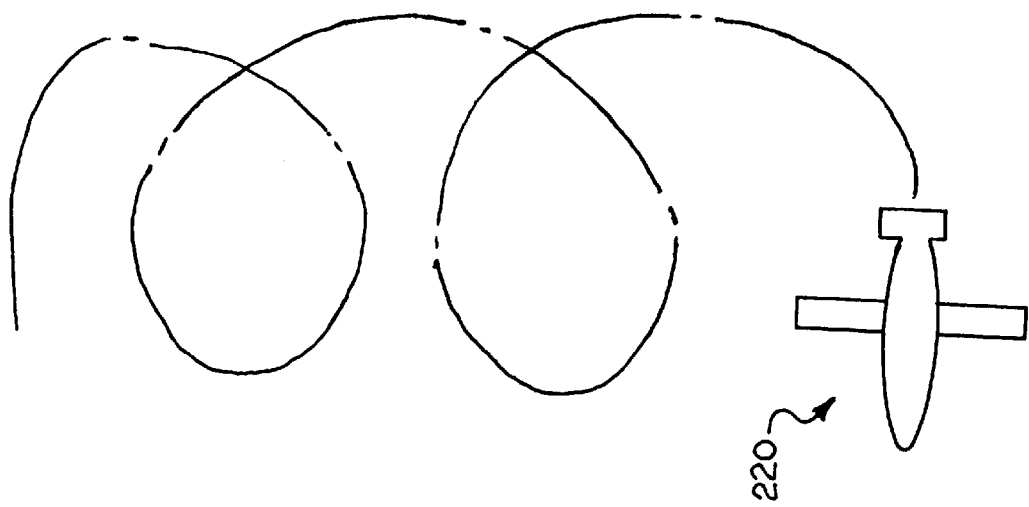
FIG. 5 is a is a diagrammatic plan detail view of one miniature, remotely piloted aircraft conducting a search while flying in a localizing mode of operation.

In the new flight path, as illustrated in FIG. 5, airborne scanning platform 220 periodically overlaps its own path, and overlaps previously searched portions of the search site. This is done to acquire location data of the subject being monitored by detecting at least one characteristic of each one of plural receptions of response signals spaced apart in time. The plural receptions are made by the one scanning platform engaged in localizing. The scanning platform analyzes characteristics of detected plural receptions, and determines the location of the subject being monitored responsively to analysis of the detected characteristics. Characteristics of response signals which may be analyzed to determine the location of their origin include directionality, time difference of arrival, and signal strength. These characteristics can be analyzed by central station 26, with only input data being obtained by the scanning platform engaged in localizing and transmitted to central station 26. Alternatively, a microprocessor, where provided onboard for scanning platforms, may be utilized so that at least part of the calculations are performed at the scanning platform rather than at central station 26.

Identification of location of the monitored subject can be annunciated in any suitable way. For example, location may be depicted locally at central station 26, such as by depicting location on a screen of a monitor or audibly or both. Alternatively, or in addition to local annunciation of determination of location, location may be annunciated remotely, such as at any scanning platform or at search facilities such as motor vehicles which are not themselves scanning platforms.

Ability of scanning platforms to come into close proximity to the sought subject for both triangulation and localizing enables beacon 10 to operate at remarkably low power. As employed herein, low power signifies that a response signal transmitted from the transmitter is not of sufficient strength to be received at every point of the search site. Also, low power signifies that small commercially available battery cells are sufficient to power the transmitter for the duration of the search. Actual power consumption may be, for example, on the order of less than ten milliwatts. Therefore, the subject of monitoring is provided with a low powered transmitter, which enables beacon 10 to be as compact, lightweight, unobtrusive, and as easily attached to the subject being monitored as is feasible.

By contrast, the scanning platforms are provided with relatively high powered transmitters. This signifies that distance of effective transmission is considerably greater than is distance of transmission of response signals by beacon 10. For example, each scanning platform can transmit signals to central station 26 from any point within a predetermined search area, even when central station 26 is itself located outside the search area.

The invention may be regarded as both method of locating a subject being monitored, and also as that apparatus which must be provided to cooperate with existing systems such as the GPS. When considered as apparatus, the invention requires at a minimum beacon 10, at least three scanning platforms of which at least one is mobile, and central station 26. It would be possible to combine functions, such as for example locating central station 26 at tower 102 or motor vehicle 108.

The invention is susceptible to other variations and modifications which may be introduced thereto. For example, although the invention has been described as utilizing radio frequency signals, it would be possible to utilize other forms of radiant energy. Illustratively, water craft could issue sonar signals. Airborne scanning platforms could utilize laser, infrared, and still other forms of energy signals where this is feasible or desirable. The scanning platforms could utilize one form of energy for intercommunication, and a different form of energy for contacting the subject of monitoring. Of course, radio frequency communication is required for receiving and processing GPS signals. As mentioned prior, any mix of mobile, portable, and stationary scanning platforms may be employed. Also, the number of scanning platforms may exceed the minimum number of three required to establish triangulation. Furthermore, components referred to in the singular may be provided in the plural to similar functional effect.

It is to be understood that the present invention is not limited to the embodiments described above, but encompasses any and all embodiments within the scope of the following claims.

I claim:

1. A method of locating a subject of monitoring which is out of sight of a responsible party charged with monitoring location of the subject of monitoring, comprising the steps of:

attaching a beacon comprising a transmitter and receiver of radiant energy to the subject being monitored;

providing at least one miniature, unmanned remotely guided mobile vehicle functioning as at least one first scanning platform having a transmitter and receiver of radiant energy;

providing at least two second scanning platforms each having a transmitter and receiver of radiant energy;

causing the at least one first scanning platform to negotiate a predetermined search site while under remote guidance and to transmit activation signals to the receiver of the subject being monitored;

causing each second scanning platform to transmit activation signals to the receiver of the subject being monitored;

causing the receiver of the subject being monitored to transmit a response signal from the beacon responsive to receiving an activation signal from any one of the at least one first scanning platform and the second scanning platforms;

receiving the response signal at the receiver of at least three of the first scanning platform and second platforms;

causing each one of the at least one first scanning platform and the second scanning platforms to acquire time and location data from a global positioning system;

causing each one of the first scanning platform and the second scanning platforms to transmit a location signal to a central station, wherein the location signal indicates the time and location of the first scanning platform or second scanning platform upon receiving the response signal; and performing triangulation analysis to determine location of the beacon of the subject being monitored.

2. The method of locating a subject of monitoring according to claim 1, comprising the further step of encoding each activation signal transmitted by the first scanning platform and the second scanning platform in a form which is readable by the receiver of the beacon of the subject of monitoring.

3. The method of locating a subject of monitoring according to claim 1, wherein said step of attaching a beacon to the subject being monitored comprises the further step of attaching a low powered transmitter of radiant energy to the beacon.

4. The method of locating a subject of monitoring according to claim 1, wherein said step of causing the at least one first scanning platform to negotiate a predetermined search site while under remote guidance comprises the further step of sweeping over the search site in a path progressively covering the search site while not overlapping previously searched portions of the search site.

5. The method of locating a subject of monitoring according to claim 4, comprising the further step of causing one of the at least one first scanning platform to alter its path to a new path when a response signal is received from the beacon attached to the subject being monitored, wherein the new path includes periodically overlapping previously searched portions of the search site.

6. The method of locating a subject of monitoring according to claim 5, further comprising the step of performing a second, different type of location procedure by acquiring location data of the subject being monitored by detecting at least one characteristic of each one of plural receptions of response signals spaced apart in time, where the plural receptions are made by only one of the at least one first scanning platforms, analyzing the detected characteristics of plural receptions, and determining the location of the beacon of the subject being monitored responsively to analysis of the detected characteristics.

7. The method of locating a subject of monitoring according to claim 1, wherein said step of providing at least two second scanning platforms comprises the further step of providing at least two miniature, remotely piloted aircraft.

8. Apparatus for conducting a search for a subject being monitored, comprising:
a central station disposed to manage the search, including a radio frequency transmitter, a radio frequency receiver operable to receive signals from a global positioning system, and a data processor disposed in communication with said transmitter and receiver, wherein said data processor is operable to determine location of any source of radio frequency signals by performing triangulation analysis when radio frequency signals are received from at least three spaced apart locations;
at least one first scanning platform having a radio frequency transmitter and a radio frequency receiver both operable to communicate with said transmitter and said receiver of said central station and with a global positioning system, wherein said first scanning platform is a miniature, remotely piloted vehicle;
at least two second scanning platforms each one of which is operable to communicate with said transmitter and said receiver of said central station and with the global positioning system; and
a portable beacon incorporating a radio frequency transmitter and receiver having a power source operably connected to said portable transmitter and receiver, wherein said portable transmitter and receiver of said beacon are operable to communicate with said transmitters and said receivers of said first scanning platform and said second scanning platforms.

9. Apparatus for conducting a search according to claim 8, wherein said first scanning platform and said second scanning platforms each are miniature, remotely piloted aircraft.

10. Apparatus for conducting a search according to claim 8, wherein said beacon includes an attachment element operable to attach said portable transmitter and receiver and said power source to the subject being monitored.

11. A method for locating a subject of monitoring, the steps comprising:
attaching a beacon comprising a transmitter and receiver of radiant energy to the subject being monitored;
providing at least one miniature, unmanned, remotely guided mobile vehicle functioning as at least one first scanning platform having a transmitter and receiver of radiant energy;
providing at least two second scanning platforms each having a transmitter and receiver of radiant energy;
causing said at least one first scanning platform to negotiate a predetermined search site while under remote guidance;
causing the at least one first scanning platform and each of the second scanning platforms to transmit an activation signal to the receiver of the subject being monitored;
causing the receiver of the subject being monitored to transmit a response signal from the beacon responsive to receiving an activation signal from any one of the at least one first scanning platform and the second scanning platforms;
receiving the response signal at the receiver of at least three of the at least one first scanning platform and each of the second scanning platforms;
causing each one of the at least one first scanning platform and the second scanning platforms to acquire time and location data from a global positioning system;
causing each one of the first scanning platform and the second scanning platforms to transmit a location signal to a central station, wherein the location signal indicates the time and location of the first scanning platform or second scanning platforms upon receiving the response signal; and
performing triangulation analysis at the central station to determine location of the beacon of the subject being monitored.

* * * * *